July 22, 1947.　　　　E. C. ELSNER　　　　2,424,442
HAND CART FOR MOLDED BLOCKS
Filed April 25, 1946　　　2 Sheets-Sheet 1
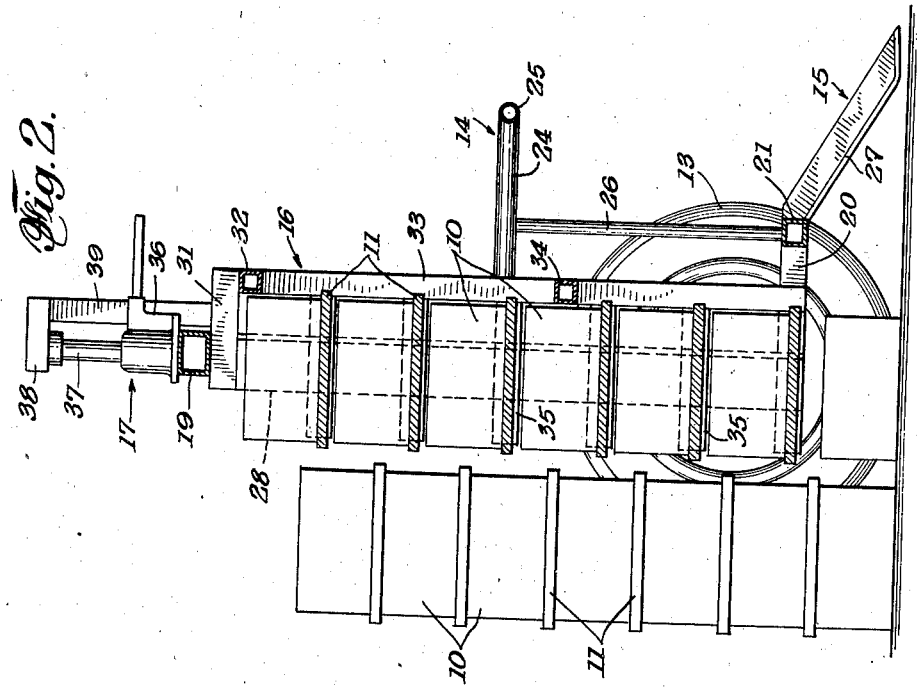
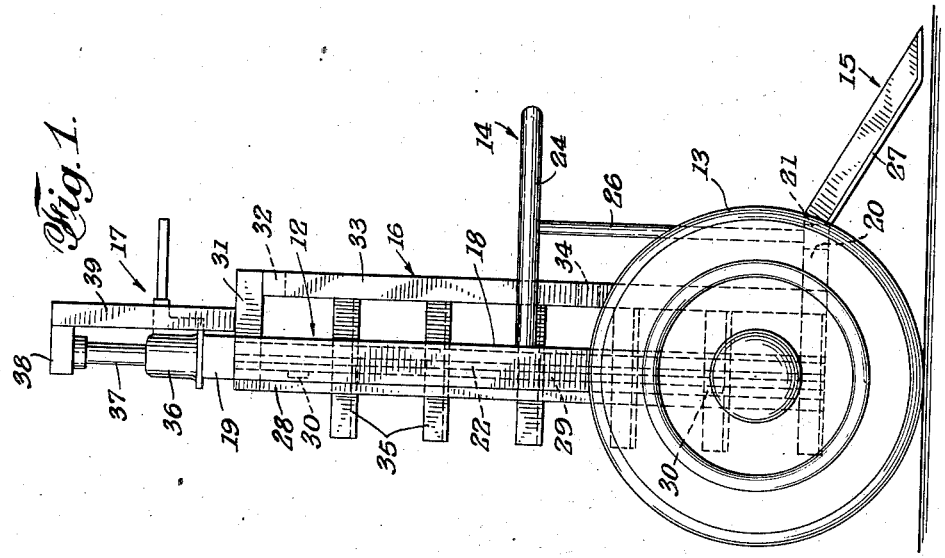
INVENTOR.
EDWIN C. ELSNER
BY C. G. Stratton
ATTORNEY

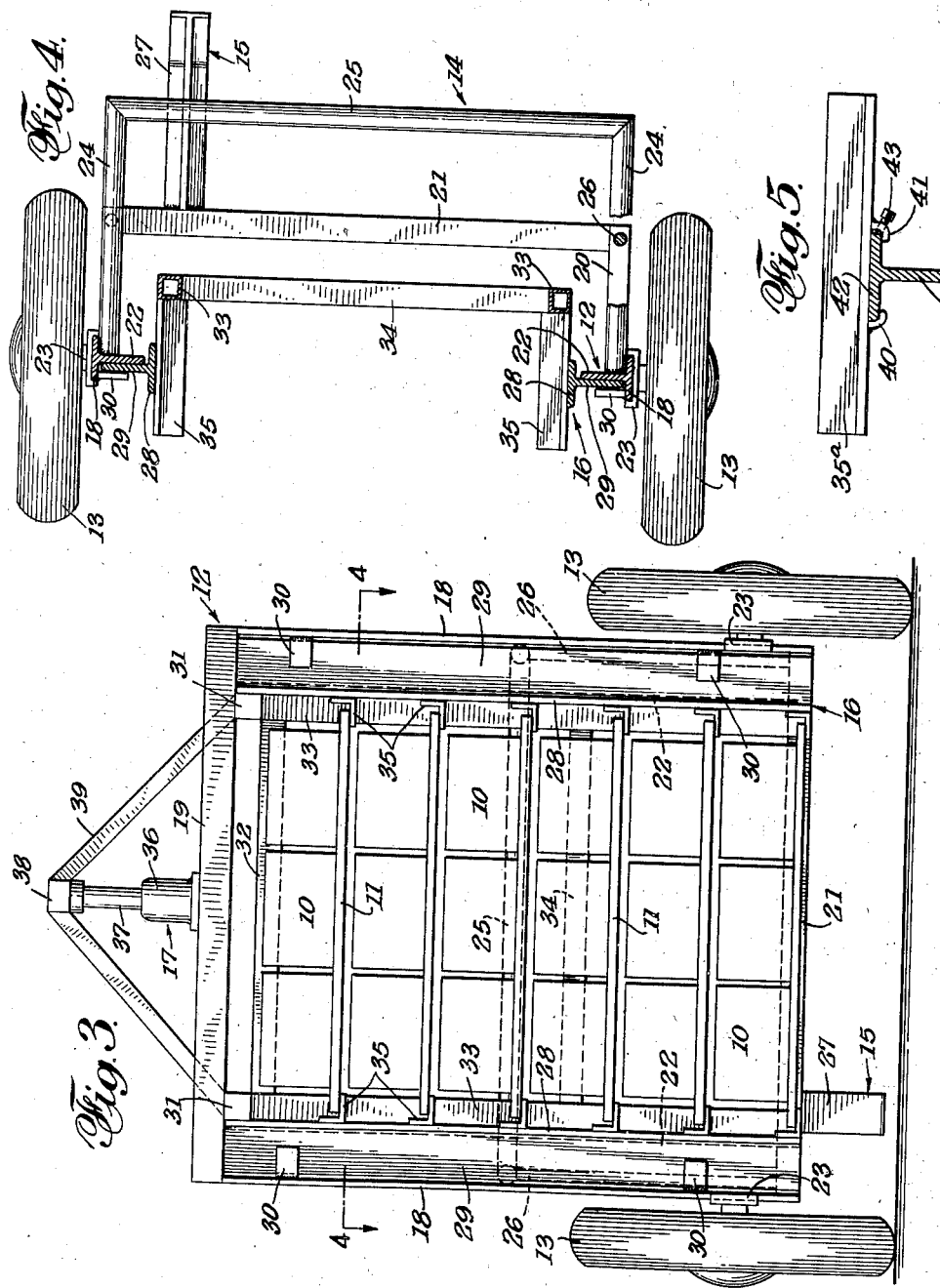

Patented July 22, 1947

2,424,442

UNITED STATES PATENT OFFICE 2,424,442

HANDCART FOR MOLDED BLOCKS

Edwin C. Elsner, Burbank, Calif., assignor of one-half to Joseph W. Schulze, North Hollywood, Calif.

Application April 25, 1946, Serial No. 664,930

9 Claims. (Cl. 214—65.2)

This invention relates to a device for transporting articles from place to place and deals more particularly with a hand truck for transporting freshly molded blocks for deposit on a stock or drying pile.

After articles such as cement blocks are molded, a drying out and setting period must elapse before such blocks can be handled without fear of fracture or even crumbling. Heretofore, much difficulty was encountered in moving or transporting such blocks from the area or building where the molding operation is performed to a place of storage where said blocks become set after a period of time.

The primary object of the present invention, therefore, is to provide simple and effective means whereby freshly molded articles, such as cement blocks, can be safely moved to a storage pile and deposited thereon.

Another object of the invention is to provide means in the form of a hand truck on which articles of the nature referred to can be placed and so balanced with respect to the wheels of the truck that safe transportation of a plurality of said articles can be effected by one person easily and without undue strain.

Another object of the invention is to provide a hand truck, as indicated, whereby molded articles, arranged one above the other thereon, can be deposited or set down by successively lowering said articles to rest one upon the other in a stack, the operation being effected smoothly and without jar or vibration.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a side view of a truck embodying the present invention.

Fig. 2 is a sectional view thereof, as taken vertically through the middle of Fig. 3, the truck being shown in operation immediately prior to depositing its load.

Fig. 3 is a front elevational view of the truck and shown loaded.

Fig. 4 is a plan sectional view, as taken on the line 4—4 of Fig. 3.

Fig. 5 is an enlarged sectional view of a modified detail of construction.

It will be evident that the hand truck of this invention can be designed to handle various types of articles. The truck shown is designed to handle building blocks 10 which are placed on a board or tray 11. The present truck receives the block-loaded boards for safe transportation to and deposit on a storage pile.

The truck, which is designed as a two-wheeled dolly, comprises, generally, a vertical frame 12 mounted on a pair of wheels 13, adapted to be pushed or pulled along the ground by handle means 14, and to be supported when at rest by a foot 15; a relatively vertically movable frame 16 on which the block-loaded boards are supported; and means 17 mounted on the frame 12 and engaged with the frame 16 for effecting vertical movement of the latter frame with respect to the frame 12.

The frame 12 is shown as comprising a pair of vertically disposed spaced and T-sectioned members 18 connected across the top by a beam 19 so that said frame is formed as an inverted U. The lower ends of the members 18 are connected by a horizontally disposed U-shaped bracing means comprising rearwardly directed bars 20 and a cross bar 21 connecting the rear ends of the bars 20. It will be seen that the frame 12 is so formed as to provide a clear unobstructed space therebeneath. The webs 22 of the T-members 18 are directed toward each other as seen best in Fig. 4.

The wheels 13 are preferably of the pneumatic type offering resiliency tending to minimize vibration of the truck when in motion. Said wheels are mounted for free rotation on axle brackets 23 fixedly secured to the frame members 18 adjacent the lower ends thereof whereby the frame 12 is effectively balanced on said wheels.

The handle means 14 comprises a horizontally disposed U-shaped frame comprised of rearwardly extending tubular arms 24 fixed, as by welding, to an intermediate portion of the members 18, and a handle bar 25, of similar tubing connecting the rear ends of the arms 24. The frame thus formed is arranged to be waist-high for easy propulsion of the truck on its wheels. The handle means 14 may be braced by vertical connecting bars 26 extending between the respective bars 20 and arms 24.

The foot 15 is shown as a rearwardly extending bar 27 connected, as by welding, to the bar 21 and sloping downwardly from the higher level of the bar 21 toward the ground. The bar 27 is preferably disposed toward one side of the frame 12 so as not to interfere with the natural leg movements of the operator as he propels the truck along the ground. In the above manner, the truck is provided with three points of support when at rest, said points comprising the two wheels and the foot 15.

The frame 16 comprises a pair of vertically disposed spaced T-bar members 28 having their webs 29 outwardly directed to slide in guides formed by the webs 22 and lugs 30 welded to the frame members 18 as shown. The upper end of each member 28 is provided with a rearwardly extending bar 31 and said bars at their rearward ends, are connected by a cross bar 32. Extending down from said ends of bars 31, there are provided vertical bars 33 generally coextensive with the frame members 28. An intermediate point of the bars 33 is connected by a cross bar similar to cross bar 32.

The frame members 28 and the vertical bars 33 are spaced, front to back, a distance equal to approximately one-half the width of the boards 11. A plurality of shelves comprising angles 35 are secured, in cooperating pairs, to the members 28 and the vertical bars 33. The angles 35 are positioned inwardly of the frame members 28 to provide means for supporting a block-loaded board across the frame 16. The vertical spacing of the angles is such that the tops of the blocks 10 of one board 11 are clear of the under surface of the board next above.

The means 17 is provided for holding the frames 12 and 16 in desired vertical relation and to effect controlled downward relative movement of frame 16. Said means is shown as comprising a hydraulic jack 36 mounted centrally of the beam 19 and having its movable ram 37 engaged beneath a block 38 carried by a truss 39 secured, as by welding, to the frame 16. The jack can be operated to lower or raise the frame 16 with respect to the frame 12.

In use, the truck is allowed to tilt back and rest on its foot 15, giving the truck a slight angularly rearward position. Blocks 10 on boards 11 can now easily be loaded on the frame 16 by slipping the boards on opposed aligned angles 35. The truck can thus be loaded with assurance of its stability. By grasping the handle bar 25, the truck can be forwardly tilted until balanced on the wheels 13 and can now be easily propelled along the ground with safety to the blocks. When the point of deposit or storage is reached, as shown in Fig. 2, the jack 36 is operated to cause the frame 16 to lower. It will be evident that the lowermost block-loaded board will come to rest either on the ground or upon blocks placed to receive it. As the frame 16 continues to lower, the block-loaded board next above will come to rest upon the top surfaces of the lowermost blocks. Continued movement of the frame will cause the remaining block-loaded boards to be deposited consecutively, safely and without jar to form a pile or stack as shown at the left of Fig. 2. The empty truck can now return for another load to receive the same after the elevated position of the frame 16 is restored by operation of the jack.

As above indicated, the truck can be designed and the shelf angles 35, spaced to handle articles of specific size and shape. If desired, greater flexibility of use can be imparted to the device by mounting the angles for adjustment vertically. Fig. 5 shows such an arrangement wherein each angle 35a is provided with lugs 40 and 41 slidably engaged with the vertical edges of the flange 42 of each member 28. By means of a set screw 43 carried by one of said lugs, each angle 35a can be secured in a desired position of vertical adjustment on the frame members 28.

While I have illustrated and described what I now regard as the preferred embodiments of my invention, the constructions are, of course, subject to modifications without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. A truck comprising a relatively fixed frame having guides, a pair of wheels supporting said frame, a pair of spaced members mounted for movement in the guides of the fixed frame, pairs of spaced supports on the movable members for articles, and means connecting the frame and spaced members to move the movable members downwardly with respect to the fixed frame, whereby said articles are deposited in a stacked pile one upon the other.

2. A truck of the character described, comprising an inverted U-shaped frame, a pair of wheels mounted to balance said frame and whereby it is movable along the ground, truck-propelling handle means secured to the frame, guides in said frame, and a frame mounted for relative up and down movement in said guides and provided with vertically spaced supports.

3. A truck of the character described, comprising an inverted U-shaped frame having spaced lugs forming guides, a pair of wheels mounted to balance said frame and whereby it is movable along the ground, truck-propelling handle means secured to the frame, a rearwardly extending support foot cooperating with the wheels to support the frame in a nearly upright position when at rest, spaced vertical members arranged for up and down movement in said guides, said members having spaced pairs of support members mounted for relative up and down movement in said guides.

4. A truck of the character described, comprising an inverted U-shaped frame, a pair of wheels mounted to balance said frame and whereby it is movable along the ground, truck-propelling handle means secured to the frame, a rearwardly extending support foot cooperating with the wheels to support the frame in a nearly upright position when at rest, guides in said frame, and an article-supporting frame mounted for relative up and down movement in said guides, said latter frame comprising spaced vertical members engaged in said guides, and a plurality of vertically spaced pairs of support members carried by the vertical members.

5. A truck of the character described, comprising an inverted U-shaped frame, a pair of wheels mounted to balance said frame and whereby it is movable along the ground, truck-propelling handle means secured to the frame, a rearwardly extending support foot cooperating with the wheels to support the frame in a nearly upright position when at rest, guides in said frame, and an article-supporting frame mounted for relative up and down movement in said guides, said latter frame comprising spaced vertical members engaged in said guides, and a plurality of vertically spaced pairs of adjustable support members carried by the vertical members.

6. In a truck of the character described, a fixed frame a frame vertically movable in said fixed frame and comprising laterally spaced vertical members, a plurality of vertically spaced pairs of support members carried by the vertical members shelves loosely mounted on said support members, and means for adjusting the vertical position of said support members on said vertical members.

7. A truck of the type referred to comprising T-sectioned members connected to form substantially an inverted U and provided with lugs to form guides, a pair of wheels supporting said frame, a foot member to maintain said frame in substantially an upright position, a frame movable vertically in said guides, support members adjustably connected to said frame in spaced relation, and handle means connected to said T-sectioned members for moving the truck.

8. A truck of the type referred to comprising T-sectioned members connected to form substantially an inverted U and provided with lugs spaced from the webs of said members to form guides, a pair of wheels supporting said frame, a foot member to maintain said frame in substantially an upright position, a pair of T-sectioned members connected to form a frame, the webs of said frame slidable in said guides, and adjustable supports carried by said members.

9. A truck of the type referred to comprising an inverted U-shaped frame, having guides, a pair of wheels balancing said frame, a foot support co-operating with the wheels to maintain the frame in nearly an upright position, handle means substantially midway between the length of said frame for moving the truck, spaced vertical members engaged in said guides and connected to form a frame movable up and down in said guides, and horizontally disposed support members spaced on said vertical members and relatively adjustable thereon.

EDWIN C. ELSNER.

REFERENCES CITED

The following references are of record in the file of this patent:

UNITED STATES PATENTS

| Number | Name | Date |
|---|---|---|
| 688,981 | Zastrow | Dec. 17, 1901 |
| 835,312 | McNabb | Nov. 6, 1906 |
| 2,306,713 | Prucha | Dec. 29, 1942 |

FOREIGN PATENTS

| Number | Country | Date |
|---|---|---|
| 512,935 | Great Britain | Sept. 29, 1939 |
| 299,370 | Germany | July 10, 1917 |